United States Patent [19]

Lindenman et al.

[11] Patent Number: 5,707,070
[45] Date of Patent: Jan. 13, 1998

[54] ADJUSTABLE FIFTH WHEEL HITCH

[75] Inventors: Thomas W. Lindenman, South Bend; Richard McCoy, Granger, both of Ind.

[73] Assignee: Reese Products, Inc., Elkhart, Ind.

[21] Appl. No.: 546,386

[22] Filed: Oct. 20, 1995

[51] Int. Cl.⁶ .................................................... B62D 53/06
[52] U.S. Cl. .................. 280/438.1; 280/407; 280/407.1
[58] Field of Search .................................. 280/407, 435, 280/433, 438.1, 441.1, 407.1, 901; 292/200, 339

[56] References Cited

U.S. PATENT DOCUMENTS

| | | |
|---|---|---|
| 2,680,627 | 6/1954 | Johnson et al. . |
| 2,799,516 | 7/1957 | Greenway . |
| 2,809,747 | 9/1957 | Tuso, Jr. . |
| 2,819,096 | 1/1958 | Sencenich .................. 280/407 |
| 2,860,891 | 11/1958 | Ramun . |
| 2,900,194 | 8/1959 | Lay .............................. 280/407 |
| 2,985,463 | 5/1961 | Geerds . |
| 3,112,936 | 12/1963 | Cole et al. ................... 280/407 |
| 3,170,716 | 2/1965 | Walther et al. . |
| 3,402,944 | 9/1968 | Day . |
| 3,584,899 | 6/1971 | Gottler et al. ................ 280/407 |
| 3,606,384 | 9/1971 | Fontaine et al. . |
| 3,746,369 | 7/1973 | Neff et al. . |
| 3,861,709 | 1/1975 | Mulcahy et al. ............... 280/407 |
| 3,893,710 | 7/1975 | Madura . |
| 4,134,601 | 1/1979 | Propst . |
| 4,429,892 | 2/1984 | Frampton et al. . |
| 4,505,344 | 3/1985 | Hobbs et al. . |
| 4,614,355 | 9/1986 | Koch . |

*Primary Examiner*—Brian L. Johnson
*Assistant Examiner*—Gary Savitt
*Attorney, Agent, or Firm*—King and Schickli

[57] ABSTRACT

An adjustable fifth wheel hitch includes a support frame having base rails that are secured to the frame of a vehicle and a pair of spaced guide rails that bridge between the base rails. The fifth wheel hitch also includes a head assembly having a jaw assembly for engaging a kingpin on a trailer. A head support and a pair of uprights mount the head assembly for relative fore-and-aft sliding movement along the guide rails between a towing position and a maneuvering position. A releasable lock secures the head assembly in either selected position. The lock includes a dual bar latch and a leaf spring for biasing the latch into a locking position. The dual bars of the latch are offset or dimensioned so that each bar is selectively received in only one of two similarly offset or dimensioned, cooperating apertures formed in one of the guide rails.

22 Claims, 6 Drawing Sheets

ADJUSTABLE FIFTH WHEEL HITCH

TECHNICAL FIELD

The present invention relates generally to the trailer towing field and, more particularly, to an improved fifth wheel hitch that is adjustable to conveniently allow enhanced maneuverability in limited or tight operating areas when required.

BACKGROUND OF THE INVENTION

Fifth wheel hitches for towing a trailer behind a towing vehicle have long been known in the art. Examples of state of the art fifth wheel hitches include those presently manufactured by Reese Products, Inc. of Elkhart, Ind. under product numbers 30026, 30027 and 30028 and U.S. Pat. No. 4,721,323.

These state of the art fifth wheel hitches include a support frame for mounting the hitch to the towing vehicle, such as, for example, to a bed of a pickup truck. This support frame includes a pair of base rails that are bolted to the bed and/or frame of the truck, side brackets that are releasably mounted to the base rails and a head support mounted to the side brackets. A head assembly is mounted to the head support by means of a trunnion arrangement allowing for pivotal fore-and-aft movement. The head assembly includes a jaw assembly operable by means of a control handle. The jaw assembly is specifically adapted to releasably engage and hold a kingpin of a trailer desired to be towed by the towing vehicle.

While such state of the art fifth wheel hitches provide excellent overall performance and dependable operation, it is believed that improvements in design are still possible. More particularly, state of the art fifth wheel hitches of the type described have no means for allowing one to enhance the maneuverability of a vehicle towing a trailer at low speeds and in close quarters. More particularly, in order to properly distribute the weight of the trailer for towing, such hitches center the kingpin of the trailer substantially over the rear axle between the rear wheels of the towing vehicle. In this position, the clearance between the trailer and body work of some towing vehicles is often only nominal. While this clearance is sufficient to allow effective operation under speed on the open road, it may hinder the tight cornering necessary to maneuver in limited spaces such as, for example, found at some trailer parks. Accordingly, a need is identified for a fifth wheel hitch that may be adjusted to increase the clearance between the trailer and towing vehicle at times of low speed towing in congested areas.

SUMMARY OF THE INVENTION

Accordingly, it is a primary object of the present invention to provide a fifth wheel hitch assembly that may be selectively adjusted to allow enhanced maneuverability when operating in limited access/congested areas where the ability to sharply corner at low speeds is desired.

Still another object of the present invention is to provide a fifth wheel hitch including a head assembly that may be selectively adjusted between a towing position providing the necessary weight distribution for stable high speed over-the-road towing and a maneuvering position providing the necessary clearance between the trailer and the body work of the towing vehicle to allow tight cornering at low speeds in confined areas.

Yet another object of the present invention is to provide an adjustable fifth wheel hitch of simple, lightweight construction that maintains a full range of height adjustment while allowing an extended range of fore-and-aft adjustment for increasing the clearance between the trailer and the body work of the towing vehicle. Advantageously, the vehicle operator need only leave the vehicle once to move the hitch between the relatively forward towing and relatively rearward maneuvering positions.

Still another object of the present invention is to provide an adjustable fifth wheel that may be selectively displaced between towing and maneuvering positions and that resists binding for smooth and efficient operation while also being retrofittable to update current base rails and head assemblies on fifth wheel hitches in the field.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved fifth wheel hitch is provided for towing a trailer behind a motor vehicle. The improved hitch has a support frame including a pair of spaced guide rails. Preferably, the guide rails are longitudinally mounted so as to bridge between a pair of spaced, transversely extending base rails of conventional design that are mounted to the frame of the motor vehicle.

The fifth wheel hitch also includes a head assembly, of a type well known in the art, having a jaw assembly for engaging a kingpin on a trailer to be towed behind the towing vehicle. Additionally, means are provided for mounting the head assembly on the pair of spaced guide rails so that the head assembly is selectively displaceable between a towing position wherein the weight of the trailer is distributed for high speed over-the-road towing and a maneuvering position wherein the clearance between the trailer and the body work of the towing vehicle is increased so as to allow sharper cornering.

Additionally, the fifth wheel hitch includes a means for releasably locking the head assembly in the towing and maneuvering positions. Preferably, the locking means includes at least one dual bar latch that is carried on the mounting means and at least two cooperating apertures in the pair of spaced guide rails. Each aperture is adapted to receive one and only one of the dual bars of the dual bar latch.

More particularly, the dual bars of the dual bar latch are offset from one another. Similarly, the two cooperating apertures provided in the guide rails are offset from one another. The offset of the bars of the dual bar latch and the cooperating apertures of the guide rail match so that the first bar engages and is received only within the first aperture to secure or lock the head assembly in the towing position and the second bar engages and is received only within the second aperture so as to secure the head assembly in the maneuvering position. Alternatively, the bars and apertures may be longitudinally and transversely diminsioned so that the first bar is received and engages only within the first cooperating aperture to secure the head assembly in the towing position and the second bar is received and engages only within the second cooperating aperture to secure the head assembly in the maneuvering position.

Still more specifically describing the invention, the fifth wheel hitch also includes a means for biasing the dual bar latch into a locking position. Preferably, the biasing means is a leaf spring. Each bar is substantially L-shaped and includes an arcuate surface for engaging the leaf spring. Thus, when the first bar engages the leaf spring, the second bar is biased into position to secure or lock the head assembly into the maneuvering position. In contrast, when the second bar engages the leaf spring, the first bar is biased into position to secure the head assembly into the towing position.

Preferably, the mounting means includes a pair of side brackets or uprights. One upright is received for sliding movement on each guide rail. At least one and preferably both of the uprights include a hollow cavity for receiving the dual bar latch and leaf spring. The leaf spring bridges across the cavity by engaging in slots in the opposing endwalls of the upright. Similarly, a pair of aligned, opposed apertures receive and hold the dual bar latch allowing the pivotal movement necessary to bias the bars into a position to lock the head assembly in the towing and maneuvering positions.

Preferably, each of the uprights include a mounting sleeve that is concentrically disposed around the guide rail upon which it rests. Each mounting sleeve includes a low friction shoe which allows free sliding movement along the guide rail. Together the mounting sleeves and shoes insure that non-binding movement is provided so that the head assembly may be smoothly displaced between the towing and maneuvering positions.

In accordance with still additional aspects of the present invention, the mounting means further includes a head support in the form of a cross beam for bridging between the uprights. A head support of this nature is well known in the art, serving to support or hold the head assembly while allowing relative pivotal movement of the head assembly in at least the fore-and-aft directions. This allows the head assembly to better follow the movements of the trailer during towing and thereby retain the jaw assembly in secure engagement with the kingpin at all times under normal operating conditions.

Additionally, the hitch of the present invention includes a single control handle that is connected to the dual bar latch. By manipulating the handle the operator may move the latch so that the first and second bars may be selectively biased to secure the head assembly in the towing and maneuvering positions as desired.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
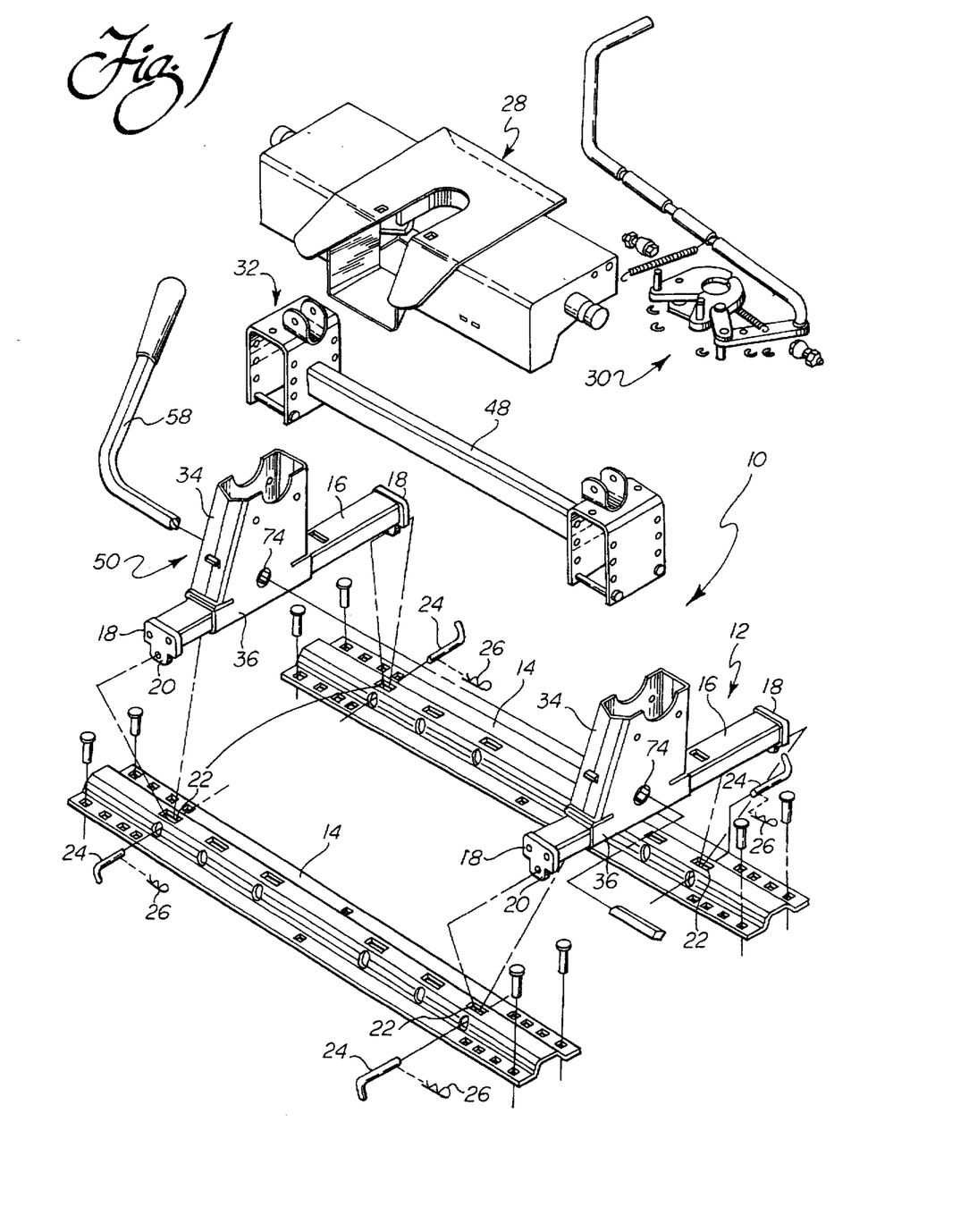
FIG. 1 is an exploded perspective view of the fifth wheel hitch of the present invention for towing a trailer behind a motor vehicle.

Reference is now made to FIG. 1 showing the fifth wheel hitch 10 of the present invention. The hitch 10 includes a support frame, generally designated by reference numeral 12, comprising a pair of spaced, parallel base rails 14 of conventional design which are bolted or otherwise fastened to the frame of the motor vehicle in a manner well known in the art. Additionally, the support frame 12 includes a pair of spaced guide rails 16 that are mounted so as to bridge between the transversely extending base rails 14 and thereby extend parallel to the longitudinal axis of the motor vehicle. More particularly, each guide rail 16 is formed from a four sided tube constructed from steel or other appropriate high strength material. An end cap 18 may be welded, fixed with bolts or mounted in some other manner at each end of the guide rails 16. Each end cap 18 includes a downwardly depending tab 20 adapted for receipt in a matching slot 22 formed in the base rails 14. A connecting pin 24 may be passed through aligned, cooperating apertures in each of the base rails 14 and tabs 20. A pin clip or other means 26 may then be utilized to secure each connecting pin 24 and, therefore, the guide rails 16 in position.

As is known in the art, the fifth wheel hitch 10 also includes a head assembly generally designated by reference numeral 28. The head assembly carries a jaw assembly, generally designated by reference numeral 30, for releasably engaging the kingpin of a trailer to be towed by the motor vehicle equipped with the hitch 10. Such jaw assemblies 30 are well known in the art. One such jaw assembly 30 that may be utilized is disclosed in co-pending patent application Ser. No. 08/345,197 entitled "Jaw Assembly For A Fifth Wheel Hitch" also owned by the assignee of the present invention. The disclosure in this patent application is fully incorporated herein by reference.

The hitch 10 also includes a means, generally designated by reference numeral 32 for mounting the head assembly 28 on the pair of spaced guide rails 16 so that the head assembly 28 is selectively displaceable between a towing position for properly distributing the weight of the trailer for high speed over-the-road towing and a maneuvering position for providing added clearance between the body work of the motor vehicle and the trailer. This added clearance provides the necessary space to allow the operator to negotiate tight corners without the trailer interfering with and engaging the body work. Hence, greater maneuverability is provided for vehicle operation in confined areas such as are often encountered in parking lots, trailer parks, campgrounds and the like. More specifically, the mounting means 32 includes a pair of side brackets or uprights 34. One upright 34 is mounted for sliding movement along each guide rail 16. As should be appreciated, each upright 34 includes an integral sleeve 36 that is disposed around and received over an associated guide rail 16. A recess 38 formed in the split upper walls of the sleeve 36 is adapted to receive a low friction shoe 40. Preferably, the shoe 40 is formed from nylon, polytetrafluoroethylene or other known low friction material and is configured to fit within but substantially fill the recess 38. Each low friction shoe 40 is held in position by one half of the split the upper wall 41, the sidewalls 42 and front and rear flanges 44 of the sleeve 36 as well as the upper, load bearing surface 46 of the guide rail 16 upon which the upright 34 is supported.

A cross member or head support 48 of a type well known in the art bridges between and interconnects the uprights 34. Preferably, the head support 48 is height adjustable to enhance the versatility of the hitch 10 in interconnecting motor vehicles and trailers of various height dimensions. As is further known in the art, the head assembly 28 is pivotally mounted to the head support 48. This pivotal connection may be accomplished by any means well known in the art including but not limited to that disclosed in co-pending patent application Ser. Nos. 08/345,198, entitled "Fifth Wheel Hitch With Side Pivot Lock" and 08/319,758, entitled "Fifth Wheel Hitch Assembly" also both owned by the assignee of the present invention. The disclosure in both of these patent applications is fully incorporated herein by reference. As should be appreciated, the low friction shoes 40 and relatively wide sleeves 36 of the uprights 34 compliment each other and insure that the head assembly 28 may move freely, without binding between the towing and maneuvering positions as described in greater detail below.

Figures 2, 2A:
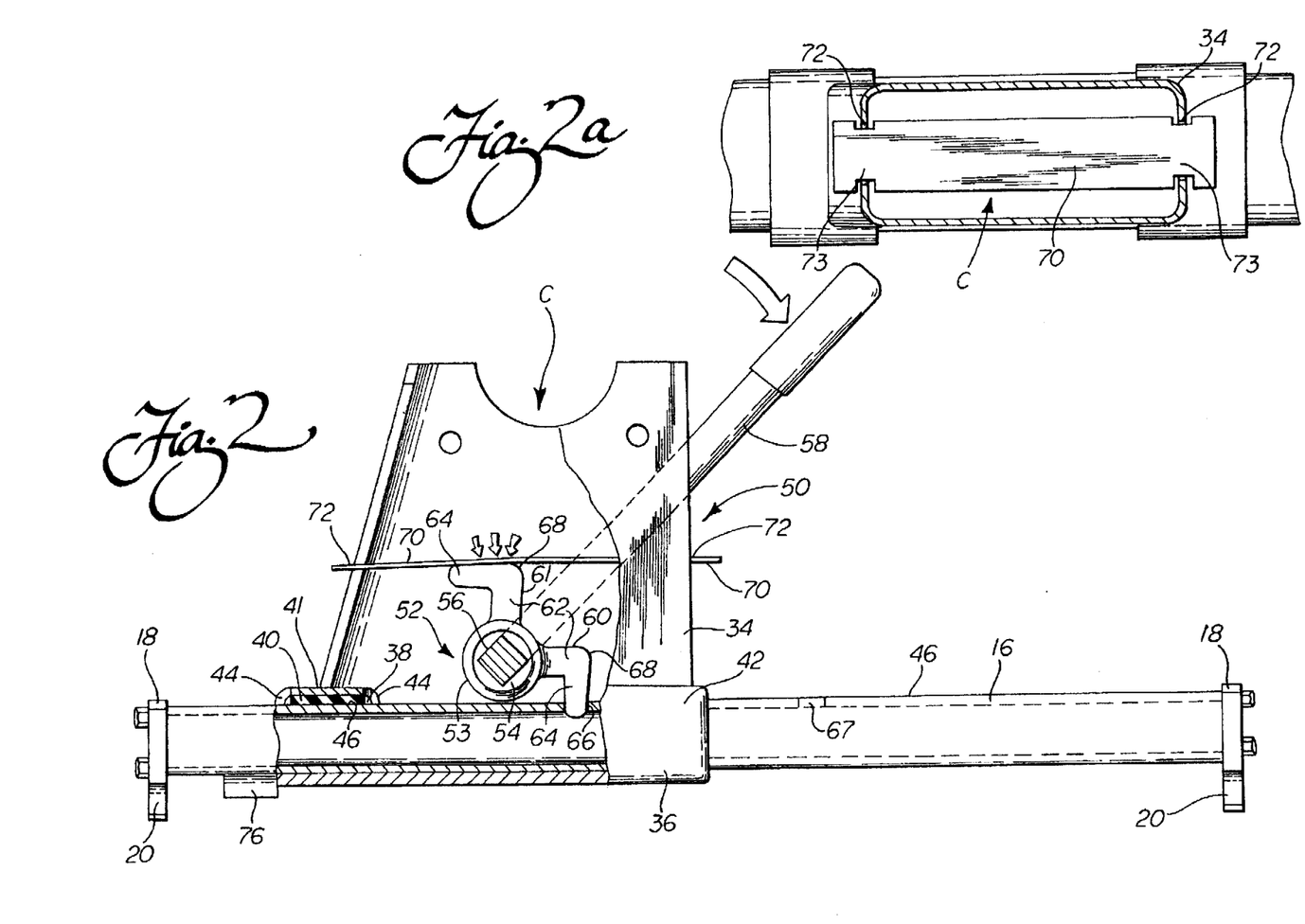
FIG. 2 is a side elevational and partially cross-sectional view showing the hitch of FIG. 1 in the towing position with the head support and head assembly removed.
FIG. 2a is a partially sectional detail showing the mounting of the leaf spring in an upright.
Figures 4, 5:
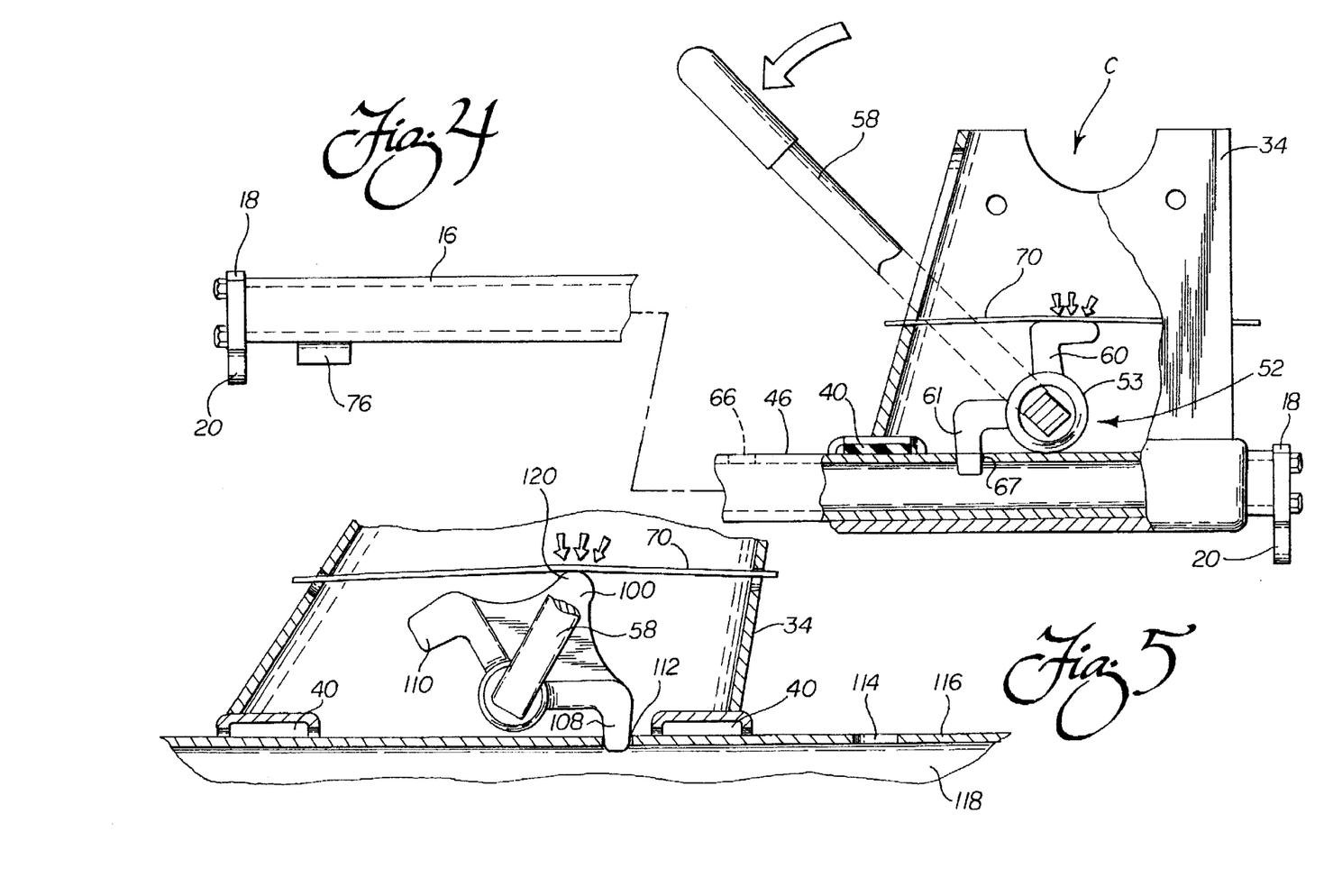
FIG. 4 is a view similar to FIGS. 2 and 3 but showing the hitch locked in the maneuvering position.
FIG. 5 is a detailed side elevational view showing a dual bar latch of alternative configuration with the head assembly engaged in the towing position.

As should further be appreciated, the hitch 10 includes a means, generally designated by reference numeral 50 for releasably locking the head assembly 28 in the towing and maneuvering positions (see FIGS. 2 and 4 respectively). The locking means 50 comprises at least one dual bar latch 52. More preferably, two dual bar latches 52 are provided, one pivotally mounted within an internal cavity C formed in each upright 34.

Each dual bar latch 52 includes a hub 53 comprising a mounting trunnion 54 about which the dual bar latch 52 is pivoted and a square through-hole 56 for receiving a square cross-sectioned control handle 58. Additionally, each latch 52 includes a pair of outwardly projecting bars 60, 61. Preferably, the bars 60, 61 are substantially L-shaped. The proximal legs 62 of the bars 60, 61 engage the hub 53 and define an included angle therebetween of approximately 30°. The distal legs 64 of each bar 60, 61 include a tip adapted for receipt in one of two cooperating locking apertures 66, 67 formed in an upper surface 46 of the guide rails 16. A smoothly curved, arcuate surface 68 defines the outer surface of the intersection of the proximal and distal legs 62, 64.

The locking means 50 also includes a biasing means in the form of a leaf spring 70. As shown, like the dual bar latch 52, one leaf spring 70 is secured in the cavity C formed in each upright 34. More specifically, it should be appreciated that the uprights 34 are formed from two half sections. The front and rear walls of the two half sections include aligned, cooperating slots 72 that secure the notched distal ends of the leaf spring 70 so that the leaf spring 70 is held in a position bridging across the cavity C overlying each dual bar latch 52 (see FIG. 2a). Aligned cooperating apertures 74 in the sidewalls of the two half sections of the upright 34 are sized to receive the trunnion 54 so as to allow pivotal movement of the dual bar latch 52 received therebetween.

During construction, one side of the trunnion 54 of the dual bar latch 52 is positioned in the aperture 74 of one of the half sections of the upright 34. At the same time, a leaf spring 70 is positioned so that the distal ends thereof fit in the slots 72 in that same half section of the upright 34. The other half section is then positioned against the first half section so that the opposite end of the trunnion 54 is received in the aperture 74 in that half section and the notched ends 73 of the leaf spring 70 are likewise received in the slots 72 of that half section. The two half sections of the upright 34 are then welded or otherwise secured together thereby capturing the leaf spring 70 and the dual bar latch 52 in position.

The operation of the hitch 10 will now be described in detail. As shown in FIG. 2, the hitch 10 is in the towing position. More specifically, the head assembly 28 is positioned toward the front end of the hitch 10 (toward the left of the Figure) where the weight of the trailer is better distributed for stable, over-the-road towing at high speeds. In this position, the uprights 34 each engage a stop 76 that may be secured to or integrally formed on the guide rails 16. Additionally, the first or rearwardly projecting bar 60 of each latch 52 is received in the first or forward locking aperture 66 in the adjacent guide rail 16. As should be appreciated, the arcuate surface 68 on the second or forwardly disposed bar 61 engages the leaf spring 70 "over-center" so that the first bar 60 is reliably secured and biased into engagement in the locking aperture 66. Thus, it should be appreciated that the head assembly 28 is reliably secured in the towing position.

Upon reaching the desired destination, low speed maneuverability may become a more desired operating characteristic than high speed towing stability. As pointed out above, in order to allow sharper cornering the clearance between the trailer and the body work of the motor vehicle must be increased. This may be done by means of a simple process. First the operator stops the motor vehicle. The operator then gets out and manipulates the control handle 58 so as to pivot the dual bar latches 52 in a counterclockwise direction as shown by action arrow A in FIG. 3. As this is done, the arcuate surface 68 on each first or rearwardly projecting bar 60 engages the associated leaf spring 70 over center. Thus, the leaf spring 70 biases the distal leg 64 of the second or forwardly directed bar 61 downwardly toward the surface of the underlying guide rail 16.

The operator then gets back into the vehicle and pulls the vehicle forward while engaging the trailer brakes. As a result of this action, the head assembly 28 held on the uprights 34 moves rearwardly (note action arrow R) to the maneuvering position shown in FIG. 4. Smooth, non-binding movement is insured by the relatively wide stance of the sleeves 36 and particularly the load bearing, low-friction shoes 40. Further, it should, be appreciated that each second bar 61 is prevented from engaging in the first locking aperture 66, 67. This is because the first and second bars 60, 61 and the first and second apertures 66, 67 are offset with respect to the longitudinal centerline underlying the guide rails 16 (note particularly, FIG. 3a). Thus, each first bar 60 will only align with and engage in the first cooperating locking aperture 66 whereas each second bar 61 will only align with and engage in the cooperating second locking aperture 67.

As the head assembly 28 moves rearwardly and the upright sleeves 36 engage against the rearward end caps 18, the tapered tip of the distal leg 64 of each second bar 61 is biased down into the cooperating second locking aperture 67 by the force generated by the associated leaf spring 70. The trailer is then secured in the maneuvering position with a significant increase in clearance of, perhaps, 9 inches between the trailer and the body work of the motor vehicle. This added space or clearance allows for sharp cutting so that the operator may negotiate in tight areas where maneuverability is required.

Of course, a similar, simple procedure may be utilized to return the head assembly 28 to the towing position. When the added clearance for utmost maneuverability is no longer required, the operator stops the motor vehicle, gets out and rotates the control handle 58 in a clockwise direction. This pivots the latches 52 causing each forwardly projecting second bar 61 to pivot out of the cooperating second locking aperture 67. The arcuate surface 68 of each second bar 61 is then placed in over center engagement with the associated leaf spring 70 so that the distal end of each first bar 60 is biased downwardly into engagement with the upper surface 46 of the underlying guide rail 16. The operator then gets back into the vehicle and backs the vehicle toward the trailer with the trailer brakes engaged. This causes the head assembly 28 held on the uprights 34 to slide forward along the guide rails 16 on the low friction shoes 40. This forward sliding movement continues until the sleeves 36 of the uprights 34 engage the stops 76. Substantially simultaneously, the leaf springs 70 bias the tapered ends of the first bars 60 back into the cooperating first locking apertures 66. Of course, the first bars 60 are prevented from hanging up in the second locking apertures 67 because of the offset arrangement described above and shown in FIG. 3a.

An alternative embodiment of the present invention is illustrated in FIGS. 5, 5a, 5b, 5c and 6. In this alternative embodiment a dual latch bar 100 of alternative design is provided. Like the dual latch bar 52 the latch bar 100 includes a hub 102 comprising a mounting trunnion 104 about which the dual latch bar 100 is pivoted and a square through-hole 106 for receiving the square cross-section control handle 58. Additionally, each latch 100 includes a pair of outwardly projecting, substantially L-shaped bars 108, 110. The proximal legs of the bars 108, 110 engage the hub 102. The distal end of each bar 108, 110 defines a tip adapted for receipt in one of two cooperating locking apertures 112, 114 formed in the upper surface 116 of the underlying guide rail 118 (see also FIG. 6). A centrally located projecting lug 120 with an arcuate outer surface is provided for engaging the leaf spring 70 and providing the desired biasing force to lock the bars 108, 110 individually in cooperating apertures 112, 114 in a manner described above with respect to the first embodiment.

Figure 6:
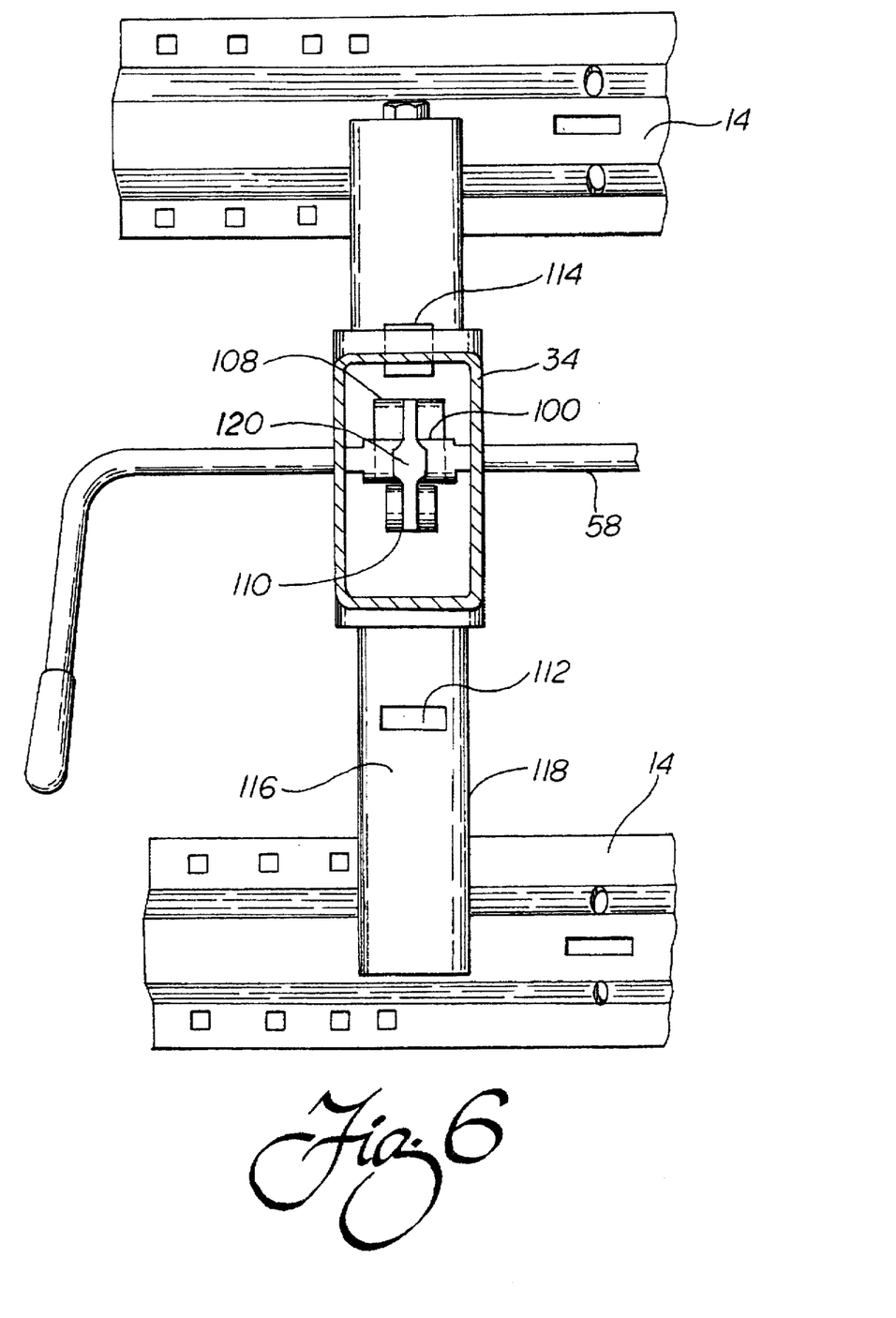
FIG. 6 is a partially fragmentary top plan view of the alternative embodiment wherein aligned latch bars of differing cross sectional dimensions are shown along with the sized, cooperating apertures in the underlying spaced guide rails (again with the head support and head assembly removed for clarity of presentation as in FIG. 3a).

As should be appreciated from reviewing FIGS. 5 and 6, the first bar 108 cooperates with the first aperture 112 to secure the head assembly in the towing position. As shown with reference to FIGS. 5b and 5c, the first bar 108 has a greater dimension in the transverse direction than in the longitudinal direction (e.g. 1.5 inches wide and approximately 0.5 inches long). The aperture 112 is sized so as to snugly receive the bar 108, the bar 108 having a tapered tip to allow smooth entry.

Figures 3, 5A, 5B, 5C:
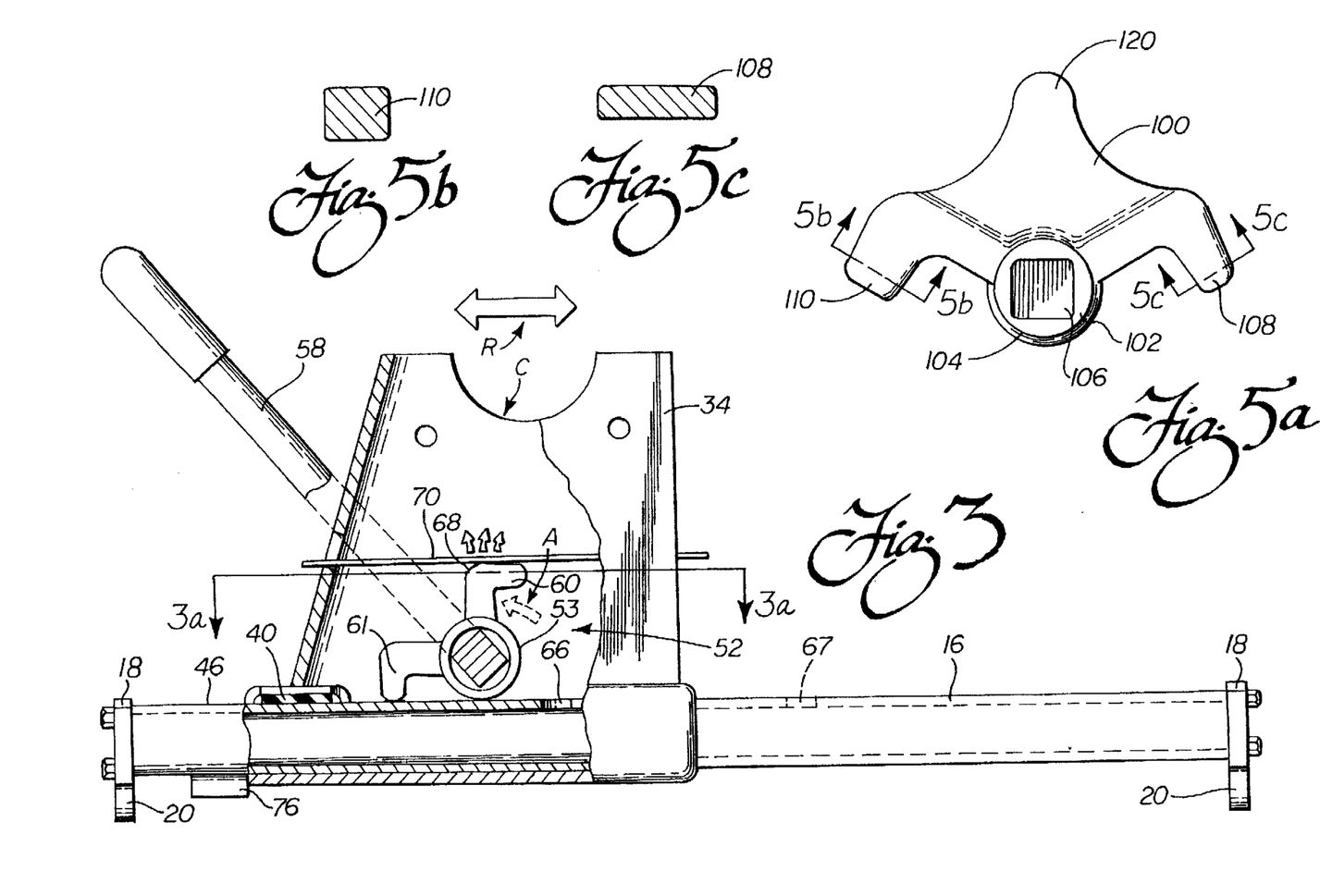
FIG. 3 is a view similar to FIG. 2 but showing the dual bar latch pivoted or flipped to allow sliding movement of the head assembly of the hitch to the maneuvering position.
FIG. 5a is a detailed side elevational view of the dual bar latch shown in FIG. 5.
FIGS. 5b and 5c are, respectively, detailed cross sectional views illustrating the different dimensions of the two bars of the dual bar latch.
Figure 3A:
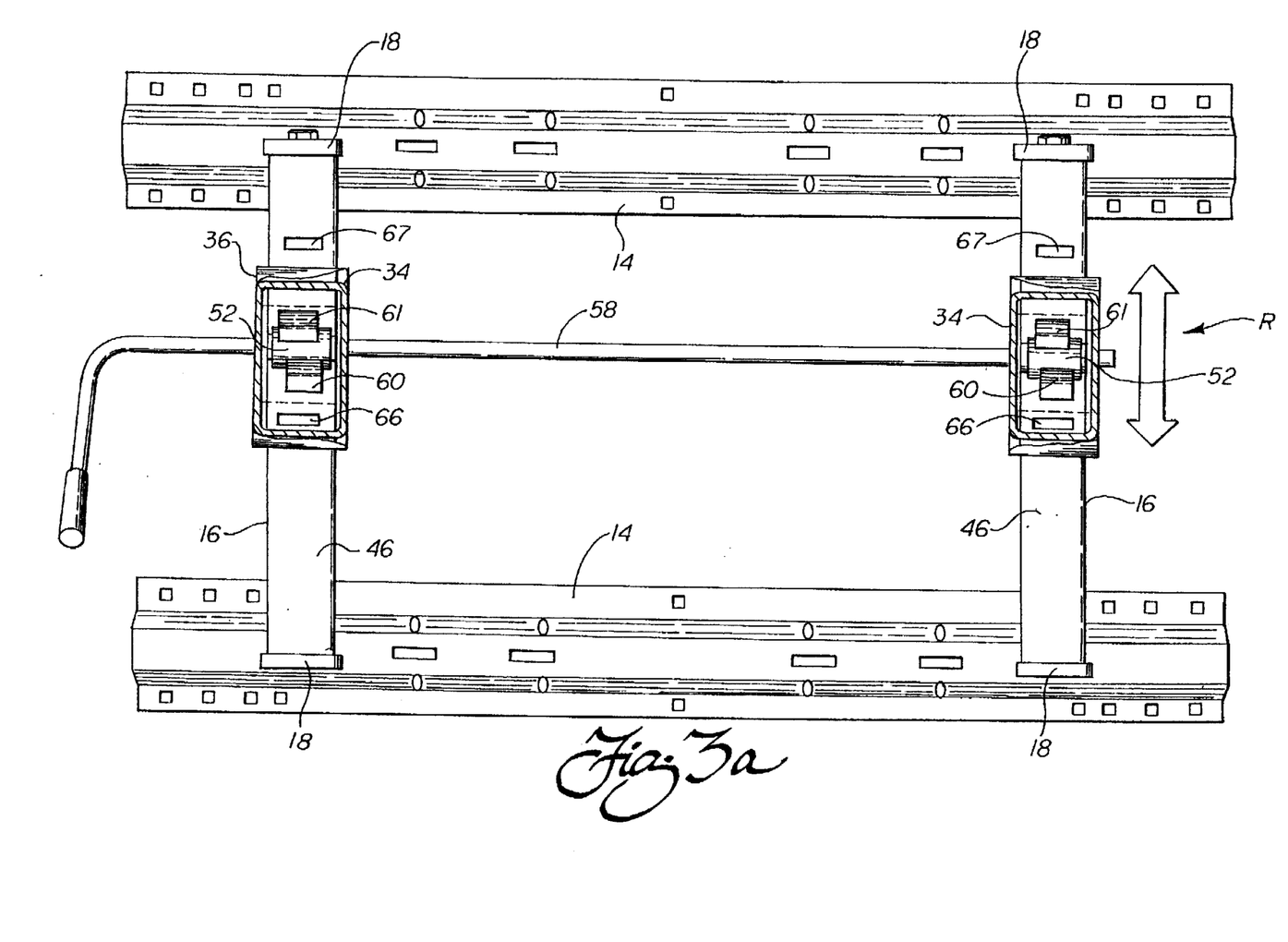
FIG. 3a is a top plan view of the hitch showing the offset of the latch bars and the cooperating apertures in the underlying spaced guide rails (again, the head support and head assembly are removed for clarity)

In contrast, the bar 110 is approximately as long as it is wide (e.g. 0.75 inches long and wide). The bar 110 engages in the second cooperating aperture 114 to secure the head assembly in the maneuvering position. Specifically, the aperture 114 is sized so as to snugly receive the bar 110; the tip of the bar 110 being tapered to allow smooth entry into the aperture.

As should be appreciated, the greater width of the bar 108 prevents the bar 108 from engaging with and entering into the aperture 114. Thus, the bar 108 may only selectively engage in the cooperating aperture 112. Similarly, the greater length of the bar 110 prevents the bar 110 from engaging with and entering into the aperture 112. Thus, the bar 110 will only engage and enter into the cooperating aperture 114. Thus, it is the dimensional differences between the bars 108, 110 and the cooperating apertures 112, 114 that insures proper function of the alternative design when adjusting the hitch 10 between the towing and maneuvering positions in the same manner the offset bars 60, 61 and apertures 66, 67 insure that function in the first embodiment.

In summary, numerous benefits result from employing the concepts of the present invention. A single control handle 58 operates both of the dual latches 52, 100. The locking means 50 includes a leaf spring 70, offset bars 60, 61 and cooperating offset locking apertures 66, 67 (or dimensional bars 108, 110 and cooperating dimensioned apertures 112, 114) so that the operator need only step out of the motor vehicle once in order to adjust the hitch 10 between the towing and maneuvering positions. Smooth non-binding sliding movement is insured by wide stance uprights 34 incorporating load bearing, low-friction shoes 40. Advantageously, such a system provides optimum performance over an extended service life. Further, it should be appreciated that the present invention allows existing fifth wheel hitches in the field to be converted to adjustable hitches. Specifically, the guide rails 16, cooperating uprights 34 and locking means 50 may be used with state of the art base rails 14, head supports 48 and head assemblies 28 so that an individual desiring adjustability need not purchase an entire new hitch system.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. An adjustable fifth wheel hitch for towing a trailer behind a motor vehicle, comprising:

a support frame including a pair of spaced guide rails;

a head assembly including a jaw assembly for engaging a trailer;

means for mounting said head assembly on said pair of spaced guide rails so as to be selectively displaceable between a towing position and a maneuvering position; and a lock for releasably locking said head assembly in said towing and maneuvering positions, said lock including at least one dual bar latch including dual bars carried on said mounting means and at least two cooperating apertures in one of said pair of spaced guide rails, said cooperating apertures being offset from one another with respect to a longitudinal axis of said one of said pair of spaced guide rails for individually receiving one dual bar of said dual bar latch, said dual bars also being offset from one another.

2. The adjustable fifth wheel hitch set forth in claim 1, further including means for biasing said dual bar latch into a locking position.

3. The adjustable fifth wheel hitch set forth in claim 2, wherein said biasing means is a leaf spring.

4. The adjustable fifth wheel hitch set forth in claim 3, wherein each bar is substantially L-shaped and includes an arcuate surface for engaging said leaf spring.

5. The adjustable fifth wheel hitch set forth in claim 4, wherein said mounting means includes a pair of uprights, one received for sliding movement on each of said pair of spaced guide rails.

6. The adjustable fifth wheel hitch set forth in claim 5, wherein at least one of said uprights includes a hollow cavity for receiving said dual bar latch and said leaf spring, said leaf spring bridging across said cavity by engaging in slots in opposing end walls of said at least one of said uprights.

7. The adjustable fifth wheel hitch set forth in claim 6, wherein each of said pair of uprights includes a mounting sleeve concentrically disposed around one of said pair of spaced guide rails.

8. The adjustable fifth wheel hitch set forth in claim 7, wherein each of said mounting sleeves includes a low friction shoe for free sliding movement along one of said guide rails.

9. The adjustable fifth wheel hitch set forth in claim 8, wherein said mounting means further includes a head support for bridging between said pair of uprights and supporting said head assembly.

10. The adjustable fifth wheel hitch set forth in claim 9, further including a control handle for operating said dual bar latch.

11. An adjustable fifth wheel hitch for towing a trailer behind a motor vehicle, comprising:

a support frame including a pair of spaced guide rails;

a head assembly including a jaw assembly for engaging a trailer;

means for mounting said head assembly on said pair of spaced guide rails so as to be selectively displaceable between a towing position and a maneuvering position;

a lock for releasably locking said head assembly in said towing and maneuvering positions, said lock including at least one dual bar latch including dual bars carried on said mounting means and at least two cooperating apertures in said pair of spaced guide rails for individually receiving one of said dual bars of said dual bar latch; and a leaf spring for biasing said dual bars latch into a locking position said fifth wheel hitch being further characterized by each of said dual bars being substantially L-shaped and including an arcuate surface for engaging said leaf spring.

12. The adjustable fifth wheel hitch set forth in claim 11, where in said mounting means includes a pair of uprights, one received for sliding movement on each of said pair of spaced guide rails.

13. The adjustable fifth wheel hitch set forth in claim 12, wherein at least one of said uprights includes a hollow cavity for receiving said dual bar latch and said leaf spring, said leaf spring bridging across said cavity by engaging in slots in opposing end walls of said at least one of said uprights.

14. The adjustable fifth wheel hitch set forth in claim 13, wherein each of said pair of uprights includes a mounting sleeve concentrically disposed around one of said pair of spaced guide rails.

15. The adjustable fifth wheel hitch set forth in claim 14, wherein each of said mounting sleeves includes a low friction shoe for free sliding movement along one of said guide rails.

16. The adjustable fifth wheel hitch set forth in claim 15, wherein said mounting means further includes a head support for bridging between said pair of uprights and supporting said head assembly.

17. An adjustable fifth wheel hitch for towing a trailer behind a motor vehicle, comprising:

a support frame including a pair of spaced guide rails;

a head assembly including a jaw assembly for engaging a trailer;

means for mounting said head assembly on said pair of spaced guide rails so as to be selectively displaceable between a towing position and a maneuvering position; and a lock for releasably locking said head assembly in said towing and maneuvering positions, said lock including at least one dual bar latch including dual bars carried on said mounting means and at least two cooperating apertures in said pair of spaced guide rails for individually receiving one of said dual bars of said dual bar latch, wherein said dual bars of said dual bar latch are dimensioned so that a first of said bars has a greater transverse and smaller longitudinal dimension than a second of said bars and said second of said bars has a greater longitudinal and smaller transverse dimension than said first of said bars.

18. The adjustable fifth wheel hitch set forth in claim 17, wherein said at least two cooperating apertures are in one of said pair of spaced guide rails and are dimensioned so that a first of said apertures has a greater transverse and smaller longitudinal dimension than a second of said apertures as to receive only said first bar and a said second of said apertures has a greater longitudinal and smaller transverse dimension than said first of said apertures so as to receive only said second bar.

19. An adjustable fifth wheel hitch for towing a trailer behind a motor vehicle, comprising:

a support frame including a pair of spaced guide rails;

a head assembly including a jaw assembly for engaging a trailer, said head assembly being mounted on said pair of spaced guide rails so as to allow selective displacement between a towing position and a maneuvering position; and a lock for releasably locking said head assembly in said towing and maneuvering positions, said lock including at least one dual bar latch including dual bars carried on said mounting means and at least two cooperating apertures in said pair of spaced guide rails for individually receiving one of said dual bars of said dual bar latch, said dual bars including a first bar for only securing said adjustable fifth wheel hitch in said towing position, and a second bar for only securing said adjustable fifth wheel hitch in said maneuvering position.

20. The adjustable fifth wheel hitch set forth in claim 19, wherein said dual bars of said dual bar latch are offset from one another.

21. The adjustable fifth wheel hitch set forth in claim 19, further including means for biasing said dual bar latch into a locking position.

22. The adjustable fifth wheel hitch set forth in claim 21, wherein said biasing means is a leaf spring.

* * * * *